United States Patent [19]

Takeuchi

[11] Patent Number: 4,640,467

[45] Date of Patent: Feb. 3, 1987

[54] KITCHEN UTENSIL

[75] Inventor: Shigeo Takeuchi, Nagoya, Japan

[73] Assignee: Takeuchi Tekko Kabushiki Kaisha, Aichi, Japan

[21] Appl. No.: 755,519

[22] Filed: Jul. 16, 1985

[30] Foreign Application Priority Data

Jan. 29, 1985 [JP] Japan .................. 60-15075

[51] Int. Cl.$^4$ .......................... A47J 43/046
[52] U.S. Cl. ................ 241/152 R; 241/282.1
[58] Field of Search ............ 241/282.1, 92, 282.2, 241/152 R, 101 B

[56] References Cited

FOREIGN PATENT DOCUMENTS 9981 2/1956 Fed. Rep. of Germany ... 241/282.1
1058299 5/1959 Fed. Rep. of Germany ... 241/282.1
1394972 3/1965 France ............................ 241/282.1
119237 11/1984 Japan .

Primary Examiner—Mark Rosenbaum
Attorney, Agent, or Firm—Armstrong, Nikaido, Marmelstein & Kubovcik

[57] ABSTRACT

A kitchen utensil for producing juice, including a rotary shaft rotated by a motor, a pre-treatment rotary blade secured to the proximal end of the rotary shaft which projects into a vessel, a first grinder member secured to the rotary shaft below the rotary blade in the vessel and a second grinder member secured to the bottom plate of the vessel so as to oppose the first grinder member. Fruit and/or vegetables put into the vessel together with a pre-determined amount of water is finely cut into pieces by the pre-treatment rotary blade and thereafter introduced into between the first and second grinding members to be mashed and ground more finely, whereby an emulsified juice is obtained.

8 Claims, 8 Drawing Figures

KITCHEN UTENSIL

BACKGROUND OF THE INVENTION

This invention relates to a kitchen utensil for obtaining juice by blending materials to be treated, for example, fruit and/or vegetables such as kale.

Conventionally juicers or mixer-blenders as disclosed in Japanese Utility Model Laid-Open No. 119237/1984 have been used for obtaining juice from vegetables such as kale and/or from fruit.

Conventional juicers adopt a centrifugal separation system or a rotary squeezing roller system for removing fiber contents in order to make a pleasant tasting drink. Therefore, it is difficult to utilize active ingredients contained in the fiber contents and the cooking efficiency is not high. A conventional mixer-blender produces juice by cutting the material to be treated with a rotary blade and mixing it with water. However, the cut pieces produced by this process are generally cube- or pyramid-shaped with sharp edges and are comparatively large so that the obtained juice is sometimes unpleasant to drink, because it causes a coarse feeling to a drinker's throat. Also, since the fibers are floating in the form of angular solid particles, they tend to sink to the bottom of the vessel of mixer and remain there as sediment when the juice is drunk.

SUMMARY OF THE INVENTION

It is an object of the invention to provide a kitchen utensil capable of producing juice which is smooth and pleasant to drink by its ability to cut a material to be treated into pieces and mashing the pieces sufficiently minutely in such a manner that fiber contents in the material are ground to be fine enough to be dissolved in the water, thus making the juice emulsified.

A kitchen utensil according to the invention includes a main body with a built-in motor, a vessel which is removably mounted on the main body, a rotary shaft which is connectable to the motor and is rotatably supported by the bottom plate of the vessel, a pre-treatment rotary blade secured to the rotary shaft in the vessel, a first grinder member which is fixed to the rotary shaft below the rotary blade and a second grinder member which is fixed to the bottom plate so as to oppose the first grinder member.

When a material to be treated is put into the vessel together with water and the rotary shaft is rotated, the material is cut into pieces of a uniform size by the pre-treatment rotary blade while being churned, and then the cut material is ground between the first and the second grinder members. As a result even hard fiber contents of the material is ground and smashed into granules fine enough to be dissolved sufficiently in the water so that an emulsified smooth juice is obtained.

BRIEF DESCRIPTION OF THE DRAWINGS

FIGS. 1 to 6 show an embodiment of the invention, wherein

FIG. 1 is an elevational view in vertical section of the entire body of the embodiment;

FIG. 2 is an enlarged elevational view of a first grinder member;

FIG. 3 is a view of the first grinder shown in a direction of arrow III in FIG. 2;

FIG. 4 is an exploded elevational view of a second grinder member;

FIG. 5 is a view of the second grinder member shown in a direction of arrow V in FIG. 4;

FIG. 6 is an enlarged elevational view in vertical section of the main part illustrating the operational state.

DESCRIPTION OF THE PREFERRED EMBODIMENT

Hereunder, an embodiment of the present invention will be explained with reference to the accompanying drawings.

Figure 1:
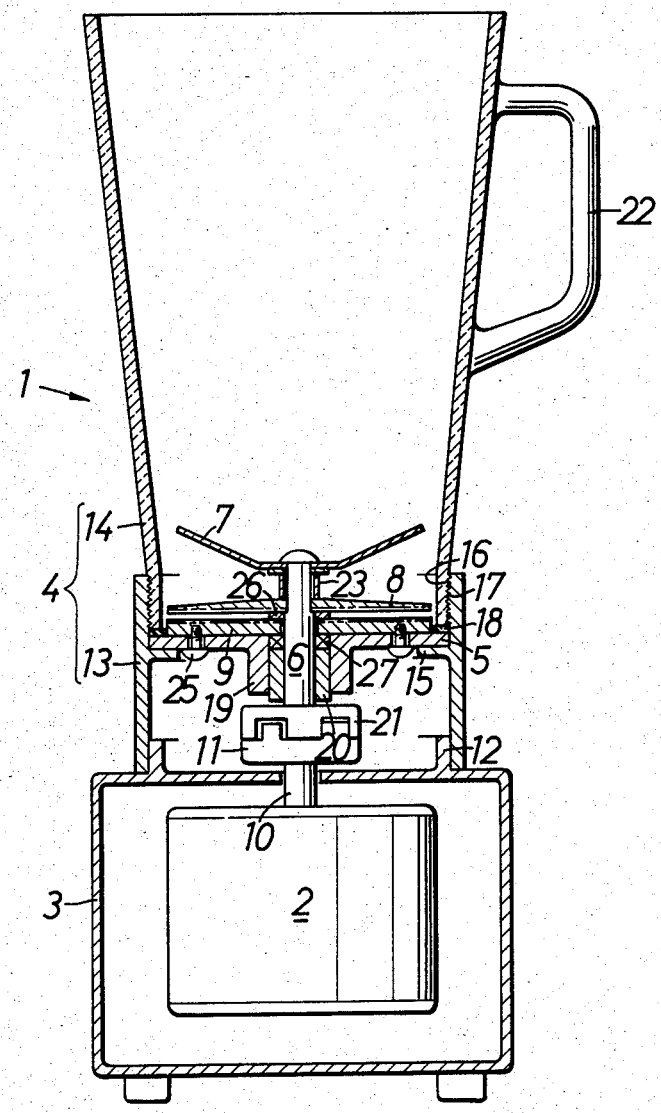

Referring first to FIG. 1, an embodiment of a kitchen utensil according to the invention is illustrated. This kitchen utensil 1 includes a main body 3 with a motor 2 built-in, a vessel 4 which is removably mounted on the main body 3, a rotary shaft 6 which is connectable to the motor 2 and is rotatably supported by a bottom plate 5 of the vessel 4, a pre-treatment rotary blade 7 secured to the upper part of rotary shaft 6 in the vessel 4, a first grinder member 8 which is fixed to the rotary shaft 6 below the rotary blade 7 and a second grinder member 9 which is fixed to the bottom plate 5 so as to face the first grinder member 8.

The main body 3 is formed in a boxlike configuration, and the motor 2 is fixed in the main body 3 in such a manner that its driving shaft 10 projects upward from the center of the upper surface of the main body 3. A connector 11 for connecting the driving shaft 10 to the rotary shaft 6 is provided at the upper end of the driving shaft 10. On the upper surface of the main body 3 is projected a cylindrical protrusion 12 for mounting the vessel 4 to the body 3 so as to concentrically surround the driving shaft 10.

The vessel 4 consists of a cylindrical container stand 13 which can be tightly fitted around the protrusion 12 and a container 14 which is made of a transparent material such as glass and which is screwed to the upper portion of the container stand 13. The container stand 13 has an inner diameter which is suitable for tight fitting engagement around the protrusion 12, and has an integral supporting collar 15 provided to radially inwardly protrude from the inner surface of the stand 13 over the entire inner circumference. A female screw 16 is threaded on the inner surface of the container stand 13 at a position above the supporting collar 15.

The container 14 is formed in the configuration of an inverted truncated cone as a whole and at the lower end it has a cylindrical lower portion with a male screw 17 formed thereon for engagement with the female screw 16. The container 14 is screwed to the container stand 13 with the bottom plate 5 and a sealing member 18 interposed between the lower end of the container 14 and the supporting collar 15. The bottom plate 5 is thus clamped and fixed between the lower end of the container 14 and the supporting collar 15.

At the center of the bottom plate 5 is integrally provided a cylindrical supporting portion 19 extending downwardly, the rotary shaft 6 being rotatably supported by this portion 19 through an oilless metal member 20 with the upper portion of the rotary shaft 6 projecting into the container 14. At the lower end of the rotary shaft 6 is provided a connector 21 which is placed in engagement with the connector 11 when the vessel 4 is mounted on the main body 3, whereby the driving force of the motor 2 can be transferred to the rotary shaft 6.

On the outer surface of container 14 near its upper end is integrally provided a handle 22 and this handle 22 can be utilized at the time of placing the vessel 4 on or removing it from the main body 3.

The pre-treatment rotary blade 7 is secured to the uppermost portion of the rotary shaft 6 which is located within the container 14, and the first grinder member 8 is secured to the rotary shaft 6 with a spacer 23 disposed between the rotary blade 7 and the first grinder member 8.

Figure 2:
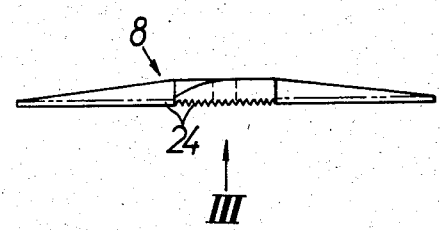
Figure 3:
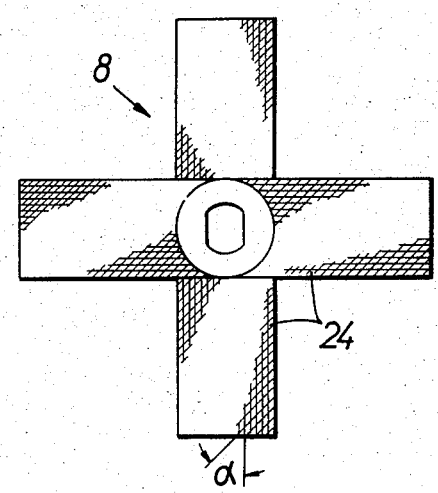

In FIGS. 2 and 3, the first grinder member 8 is formed in a cross configuration, for example, and a first grinding surface 24 is formed to extend over its entire lower surface. The first grinding surface 24 is, for example, provided by forming innumerable minute protrusions by cutting a plurality of grooves extending in a direction perpendicular to the axis of the rotary shaft 6 and another set of plural grooves disposed at an angle $\alpha$ relative to the first set of grooves.

The second grinder member 9 is secured to the bottom plate 5 by screw members 25. A spacer 26 is disposed between the second grinder member 9 and the first grinder member 8. This spacer 26 opposes the first and the second grinder members 8 and 9 to provide a minute interval between these grinder members or alternatively place the members into slight contact with each other. A sealing member 27 is inserted into the supporting portion 19 of the bottom plate 5 in such a manner that the sealing member 27 is pressed against the oilless metal member 20 by the second grinder member 9.

Figure 4:
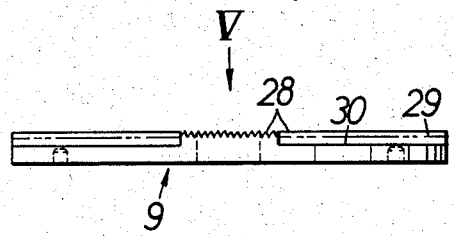
Figure 5:
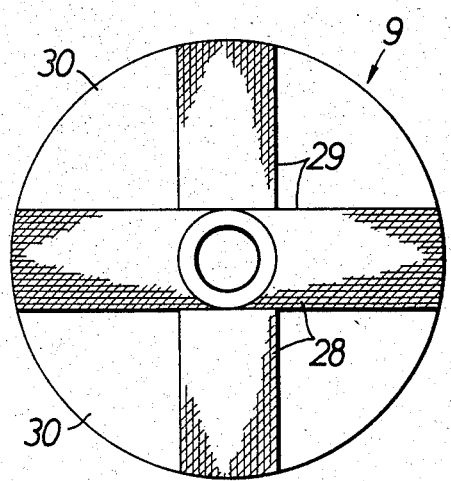

In FIGS. 4 and 5, the second grinder member 9 is formed into a disc shape, and on the upper surface thereof is provided a cross-shaped second grinding surface 28 which corresponds with the first grinding member 8. Between arm portions of the cross-shaped second grinding surface 28 are provided recessed flat surfaces 30 with stepped surfaces 29 disposed at the junctions thereof.

Figure 6:
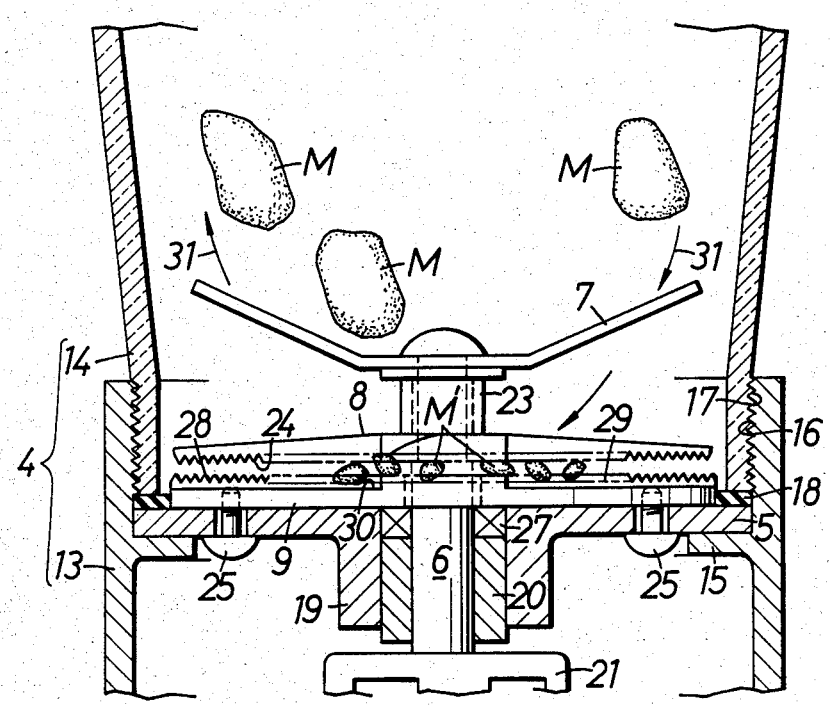

Operation of the embodiment will next be explained with reference to FIG. 6. One or more material M to be treated is put into the vessel 4 together with a predetermined quantity of water. When the motor 2 is actuated to rotate the rotary shaft 6, a circulating flow 31 which circulates vertically is generated in the vessel 4 by the rotary blade 7 and the material M is cut into small pieces by the rotary blade 7 to be a treated material M'. These small pieces are introduced into a space between the first and second grinder members 8 and 9 and mashed and ground into more minute granules, thus finishing treatment of the material M'. Since the second grinder member 9 has flat surfaces 30 between the arm portions of grinding surface 28, intake and discharge of the material M' into and from the space between the first and second grinding surfaces 24 and 28 continue smoothly in accordance with the circulating flow 31, thereby suppressing any rise in temperature of the treated material M' and temperature of the first and second grinding surfaces 24 and 28, enabling an efficient mashing and grinding operation.

The treated material M' mashed in this way is circulated in the vessel 4 in the circulating flow 31, and even its fiber contents are mashed into uniform and round minute granules which are sufficiently melted into the water, whereby an emulsified juice is obtained. Thus, the juice obtained after a blending operation of adequate duration has a sufficient amount of extract of active ingredients and is pleasant for a drinker to take without imparting any coarse feeling to the drinker's throat.

Figure 7:
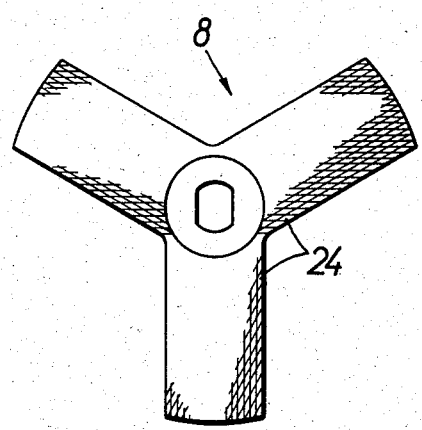
FIGS. 7 and 8, respectively, are bottom plan views of modified forms of the first grinder member.
Figure 8:
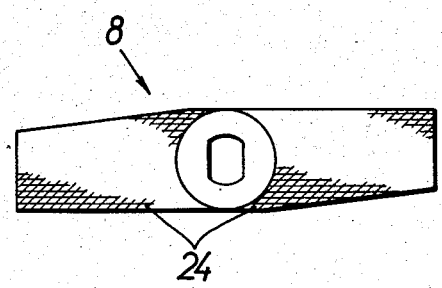

The configuration of the first grinder member 8 may be freely determined depending upon the type of material M to be treated. For example, it may be triple or Y-shaped, as shown in FIG. 7, or double bladed in I-shape, as shown in FIG. 8.

As described above, since a kitchen utensil according to the invention includes a main body having a built-in motor, a vessel removably mounted on the main body, a rotary shaft which is connectable to the motor and is rotatably supported by the bottom plate of the vessel, a pre-treatment rotary blade secured to the rotary shaft in the vessel, a first grinder member which is fixed to the rotary shaft below the rotary blade and a second grinder member which is fixed to the bottom plate so as to oppose the first grinder member, it is possible to mash a material to be treated such as a vegetable and a fruit at a space between the first and second grinder members after it is cut into pieces by the rotary blade. Accordingly even the fiber contents are mashed and ground into minute and round granules which can be sufficiently dissolved into the water. As a result, there is obtained a juice pleasant to drink, which imparts no coarse feeling to drinker's throat, and sedimentation of the fiber contents is prevented.

What is claimed is:

1. A kitchen utensil for obtaining juice comprising:
   a main body with a built-in motor;
   a vessel removably mounted on said main body for receiving therein a juice material to be treated;
   a rotary shaft which is connectable to and driven by said motor and which is rotatably supported by a bottom plate of the vessel;
   a pre-treatment rotary blade secured for integral rotation to a part of said rotary shaft which is located in said vessel, said pre-treatment rotary blade applying a pre-treatment to said juice material and concurrently generating a circulating flow of the material within the vessel;
   a first grinder member secured to said rotary shaft below said rotary blade and within sjaid vessel, the first grinder member having a grinding surface on one side surface thereof extending over substantially an entire area in a radial direction around the rotary shaft; and
   a second grinder member secured to said bottom plate and having a grinding surface provided on one side surface thereof so as to oppose said grinding surface of the first grinder member;
   wherein the grinding surfaces of the first and second grinder members cooperate with each other to apply a grinding treatment in a repeated manner to the juice material which circulates in said circulating flow within said vessel.

2. A kitchen utensil according to claim 1, wherein said grinding surfaces are formed therein with unnumerable minute protrusions, respectively.

3. A kitchen utensil according to claim 2, wherein said minute protrusions are composed of a plurality of grooves extending in a direction prependicular to an axis of the rotary shaft and another set of plural grooves disposed to cross said first mentioned plural grooves at a certain angle relative thereto.

4. A kitchen utensil according to claim 1, wherein said first grinder member is formed into a cross-configuration.

5. A kitchen utensil according to claim 1, wherein said first grinder member is formed into a Y-shape with three branches.

6. A kitchen utensil according to claim 1, wherein said first grinder member is formed into an I-shape with two branches.

7. A kitchen utensil according to claims 1, 2, 3, 4, 5 or 6, wherein said second grinder member further includes recessed flat surfaces formed on its one side surface which are connected with said grinding surface via stepped surfaces.

8. A kitchen utensil according to claim 1, wherein said vessel has an opening at an upper end thereof which serves as an inlet for the juice material and also serves as an outlet for a juice obtained after treatment.

* * * * *